US008587956B2

(12) United States Patent
Choutov et al.

(10) Patent No.: US 8,587,956 B2
(45) Date of Patent: Nov. 19, 2013

(54) INTEGRATED ELECTRONIC DEVICE FOR CONTROLLING LIGHT EMITTING DIODES

(75) Inventors: Dmitri A. Choutov, Sunnyvale, CA (US); Leonard S. Livschitz, San Ramon, CA (US)

(73) Assignee: Luxera, Inc., Fremont, CA (US)

( * ) Notice: Subject to any disclaimer, the term of this patent is extended or adjusted under 35 U.S.C. 154(b) by 304 days.

(21) Appl. No.: 13/018,159

(22) Filed: Jan. 31, 2011

(65) Prior Publication Data
US 2011/0193491 A1    Aug. 11, 2011

Related U.S. Application Data

(60) Provisional application No. 61/301,882, filed on Feb. 5, 2010.

(51) Int. Cl.
*H05K 1/18* (2006.01)

(52) U.S. Cl.
USPC ............ 361/763; 361/764; 361/674; 361/738; 362/631; 362/249.02

(58) Field of Classification Search
USPC ......... 361/748, 760, 761, 763, 764, 674, 738; 439/55, 56; 362/630, 631, 249.01, 362/249.02; 257/439, 532, 536, 539, 83, 84
See application file for complete search history.

(56) References Cited

U.S. PATENT DOCUMENTS

| | | | |
|---|---|---|---|
| 4,039,236 A * | 8/1977 | Schepler | 439/49 |
| 5,747,363 A | 5/1998 | Wei et al. | |
| 5,827,753 A | 10/1998 | Huang et al. | |
| 6,486,726 B1 | 11/2002 | Worley, Sr. et al. | |
| 6,646,491 B2 | 11/2003 | Worley, Sr. et al. | |
| 7,128,442 B2 | 10/2006 | Lee et al. | |
| 7,348,604 B2 | 3/2008 | Matheson | |
| 7,524,206 B2 * | 4/2009 | Gutierrez et al. | 439/607.01 |
| 7,553,162 B2 * | 6/2009 | Isoda et al. | 439/56 |
| 7,708,447 B2 * | 5/2010 | Tobler et al. | 362/619 |
| 8,063,575 B2 * | 11/2011 | Tobler et al. | 315/291 |
| 8,138,558 B2 * | 3/2012 | Shea et al. | 257/401 |
| 8,207,689 B2 * | 6/2012 | Tobler et al. | 315/307 |
| 2004/0004058 A1 * | 1/2004 | Smith et al. | 216/41 |
| 2006/0018098 A1 | 1/2006 | Hill et al. | |
| 2006/0022214 A1 | 2/2006 | Morgan et al. | |
| 2007/0045524 A1 | 3/2007 | Rains, Jr. et al. | |
| 2007/0273290 A1 | 11/2007 | Ashdown et al. | |
| 2008/0067527 A1 | 3/2008 | Daniels et al. | |
| 2008/0265799 A1 | 10/2008 | Sibert | |

(Continued)

FOREIGN PATENT DOCUMENTS

WO    WO2009/127340 A2    10/2009

OTHER PUBLICATIONS

Product Data Sheet SSL2101, SMPS IC for dimmable LED lighting, Rev. 04, Aug. 28, 2009.

(Continued)

*Primary Examiner* — Thuy Vinh Tran

(57) ABSTRACT

A compact driver device for driving an LED lighting device is provided. The driver device includes a substrate, power capacitor that provides LED driving current to drive the LED lighting device, and a power resistor. Advantageously, the power capacitor and the power resistor are attached to the substrate and are solderlessly connected to each other to provide a very compact driver device.

32 Claims, 6 Drawing Sheets

(56) References Cited

U.S. PATENT DOCUMENTS

2008/0277675 A1 11/2008 Fjelstad
2008/0310850 A1 12/2008 Pederson et al.
2008/0317475 A1 12/2008 Pederson et al.
2009/0021180 A1  1/2009 Underwood et al.
2009/0273300 A1 11/2009 Kayser
2010/0181833 A1* 7/2010 Wu .................................. 307/36

OTHER PUBLICATIONS

Lu et al., "A Novel Multiple Modes PWM Controller for LEDs," IEEE International Symposium on Circuits and Systems, May 24-27, 2009, pp. 1767-1770.

* cited by examiner (PRIOR ART) Fig. 2a

INTEGRATED ELECTRONIC DEVICE FOR CONTROLLING LIGHT EMITTING DIODES

CROSS REFERENCE TO RELATED APPLICATIONS

This application claims the benefit of priority under 35 U.S.C. Section 119(e) to U.S. Provisional Application Ser. No. 61/301,882, filed Feb. 5, 2010, entitled "Apparatus and Method for Operating a Light Emitting Diode Lighting Device," which is fully incorporated by reference herein.

FIELD OF THE INVENTION

The present invention is related generally to the field of electronic devices. More particularly, the present invention is related to the field of electronics for light emitting diode lighting applications.

BACKGROUND OF THE INVENTION

Light emitting diode (LED) driver is an important component of solid state lighting devices which became the lighting technology of choice for energy efficient environmentally friendly lighting. Currently, the most common solution is to apply pulse width modulation (PWM) to generate constant forward current and to control brightness by adjusting duty cycle. Depending on the input voltage, the output current and power, isolation, and other requirements a variety of PWM topologies have been used for LED driver, including buck, buck-boost, flyback, and SEP IC (Single Ended Primary Inductor Converter) topologies.

While PWM principle has been used in constant-current sources for decades, use of the PWM principle for LED lighting applications presents a number of challenges. One of the most challenging applications is in retrofit lamps that are defined as lamps compatible with existing sockets and fixtures designed for incandescent, halogen, fluorescent, compact florescent, and metal halide lamps and meet illumination requirements including Color Rendering Index (CRI). First, the LED driver must fit into a form factor defined by an evacuated glass vessel and developed over 100 years ago commonly known as A19 bulb or fit onto a standard body of a reflector lamp such as GU10 or a PAR. Next challenge is thermal management. In a LED lamp, all energy which is not converted into visible light will be turned into heat dissipated in the driver and emitter. Driver efficiency becomes an important factor as it affects heat generation and overall efficiency of the lamp. Further, the reliability of an LED driver must match 50,000 h—the life expectancy of an LED emitter. An LED lamp is expected to operate at case temperatures exceeding 100° C. and to cycle between ambient and operating temperatures several times a day which is equivalent to more than 10,000 thermal cycles over 10 year life. Thus, Current Joint Electron Devices Engineering Council (JEDEC) standards of thermal cycling reliability in the range of 500-1000 cycles are clearly not sufficient for retrofit LED lights. In addition, as a switched mode power supply, an LED driver requires optimization to meet power factor and EMI (Electromagnetic Interference) requirements. Once form factor, thermal management, efficiency, and reliability problems are solved, the cost becomes yet another problem, as high-grade 125° C., or higher rated components, must be used and design complexity increases to meet all the requirements discussed above.

The current method of LED driver manufacturing uses conventional printed circuit boards (PCB) with standard packaged components. However, such conventional PCBs' cannot meet the efficiency, thermal management, reliability and cost requirements discussed above. Therefore, there is a need to provide an improved LED driver solution which solves the above-discussed problems.

SUMMARY OF THE DISCLOSURE

According to one aspect of the present invention, a compact driver device for driving an LED lighting device is provided. The driver device includes at least one substrate, at least one power capacitor that provides LED driving current to drive the LED lighting device, and at least one power resistor. Advantageously, the power capacitor and the power resistor are attached to the substrate and are solderlessly connected to each other to provide a very compact driver device, which is efficient, durable and inexpensive to manufacture.

According to another aspect of the present invention, a compact driver device for driving an LED lighting device includes a substrate, power resistor and an inductor. The inductor and the power resistor are attached to the substrate and are solderlessly connected to each other to provide a compact driver device.

According to another aspect of the present invention, a compact driver device for driving an LED lighting device includes a substrate, a rectifier, an output power capacitor and a controller integrated circuit (IC). The rectifier rectifies AC to DC. The output power capacitor receives the DC and provides LED driving current to drive the LED lighting device. The controller IC controls the DC provided to the power capacitor. Advantageously, the rectifier, power capacitor and controller IC are attached to the substrate and solderlessly connected to each other to provide a very compact driver device, which is efficient, durable and inexpensive to manufacture.

BRIEF DESCRIPTION OF THE DRAWINGS

The present invention is illustratively shown and described in reference to the accompanying drawings.

FIG. 2*a* shows a prior art LED driver.

DETAILED DESCRIPTION OF THE INVENTION

Figure 1:
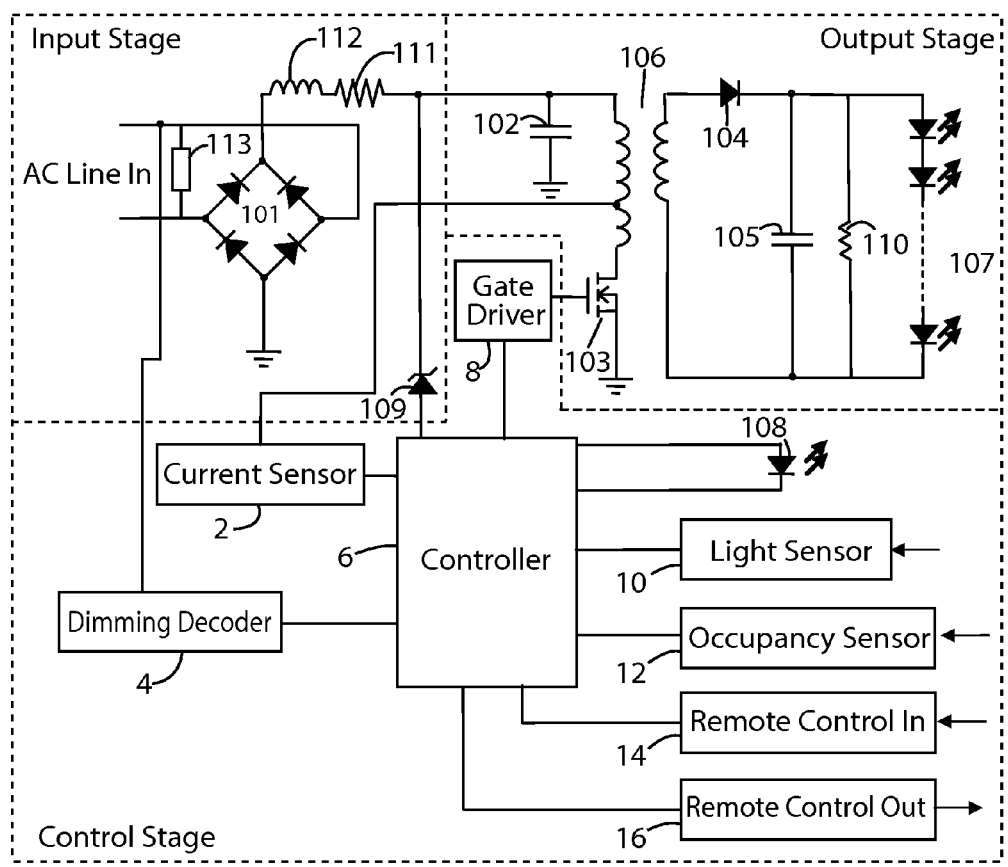
FIG. 1 is a block diagram of an LED driver.

The present invention resolves the problems described in the foregoing section. The present invention greatly reduces or eliminates the use of solder joints and individual packaging. Further, the present invention replaces organic PCBs' with a substrate with improved matching and higher thermal conductivity. The invention utilizes parallel processing of multiple components. As a result, as higher level of integration removes cost and space constraints, new features such as light sensing, occupancy sensing, remote control, and remote transmission can be added to the LED driver system without significant cost increases.

The present LED driver is comprised of one or more electronic components that are encapsulated into an organic substrate. The electronic components are connected by patterned copper and aluminum metals, or metals and metal alloys in a solderless manner. Solder is defined as Tin or Tin alloys. Thus, the term "solderless" means without Tin or Tin alloys.

The present invention further provides an LED driver comprised of one or more electronic components formed inside and attached to a silicon substrate, and connected to each other by patterned copper and aluminum metals.

The apparatus of the present invention comprises a LED lamp driver. A LED driver of the present invention can be a flyback isolated offline LED lamp driver, a buck driver, a buck-boost, a SEPIC driver or other topologies. While a large number of switch mode power supply (SMPS) topologies exist, they contain several common blocks or stages and elements shown in FIG. 1: i) input or high voltage stage, ii) output or low voltage stage, and iii) control Stage.

The input stage includes rectifier 101, filter capacitor 102, filter inductor 112, limiting resistor 111, transient voltage protector 113 and devices such as Zener diode 109. The output stage includes transformer 106, FET switch 103, diode 104, capacitor 105, and output resistor 110. The control stage includes PWM controller 6, gate driver 8, current sensor 2, dimming decoder 4, light sensor 10, occupancy sensor 12, remote control In 14 and remote control Out 16. The transient voltage protector device 113 can be either MOV (Metal-Oxide Varistor) or TVS (Transient Voltage Suppressor) diode. In this sense Transient Voltage Protector is a special case of a diode designed to protect driver circuit from an input voltage surge.

In a broad sense, the input stage's function is to rectify and filter AC voltage, to filter PWM frequency, and to protect the driver from voltage transients, the output stage's function is to step down the voltage and provide controlled current source for LEDs, and the control stage's function is to control operation of switching gate based on the number of signals including current, dimming, light intensity, and other control signals.

One embodiment of a flyback isolated offline LED lamp driver is shown in FIG. 1. With reference to FIG. 1, line AC input voltage is rectified by a rectifier (rectification bridge) 101, input capacitor 102, filter inductor 112, limiting resistor 111, and transient voltage suppressor 113. The FET gate (transistor) 103 controlled by gate driver 8 is used to generate a variable width pulses as a PWM signal. LED output circuit, including diode 104 and output capacitor 105 and resistor 110, is fully isolated from the primary circuit by transformer 106. Diode 104 can be a PN junction diode or a Schottky diode. In some embodiments, the inductor 112 has an inductance valued greater than 1 nH.

The output power capacitor 105 stores energy during PWM cycle and supplies LED driving current when FET switch is off. In some embodiments, the power capacitor has a capacitance value greater that 1 nF. The power resistor 110 connected in parallel to the LED lighting elements 107 adds stability to LED operation and prevents flashing when LED's are turned on and off by providing an additional discharge path to make the LEDs' shut down faster.

A current sensor 2 is connected between the transformer 106 and PWM controller chip 6. The controller chip 6 senses current from the current sensor 2 and is used to maintain constant current and desired setpoint. Zener diode 109 connected between the controller and the rectifier 101 is used to provide supply voltage to the controller and to protect the PWM controller chip 6 in case of an input voltage surge. In case of a buck or buck-boost topology, transformer 106 is replaced by an inductor. However, any PWM topology requires a magnetic device such as an inductor or transformer in output stage.

FIG. 1 shows one of many potential embodiments of an off line LED driver. FIG. 1 illustrates that power devices (as defined below) such as capacitors, resistors, transformers, inductors, diodes, and TSV's are used in both input and output stages.

Dimming decoder connected between the controller and the AC voltage input is required to decode TRIode for Alternating Current (TRIAC) wavefront and to adjust LED brightness accordingly. Light sensor, occupancy sensor, and remote control sensor are described in further details below. Each sensor block on the diagram contains actual sensor and amplifier/decoder to convert sensor output into controller input to adjust LED brightness and/or turn LEDs' on or off. A non-isolated buck topology can be used instead of isolated flyback topology shown in FIG. 1. In case of a buck driver, the same devices as shown in FIG. 1 are used, except the transformer which is replaced by an inductor where inductor is considered to be a transformer with a single winding.

The component devices of an LED driver can be divided into two distinctive types: i) power devices and ii) control devices. Here power devices are defined as electronic devices that used to deliver power to other devices, components, and modules. Control devices are devices that sense, amplify, and convert signals to monitor and to control the power devices. By this definition in FIG. 1, power devices include rectifier 101, input capacitor 102, FET switch 103, diode 104, output capacitor 105 and resistor 110, transformer or inductor 106 and 112, Zener diode 109, resistors 110 and 111, transient voltage protector 113. By contrast, control devices include current sensor 2, dimming decoder 4, controller 6, gate driver 8, light sensor 10, occupancy sensor 12, remote control IN 14 and remote control OUT 16.

Light sensor 10 is a photodiode sensitive to wavelengths from near infrared through visible spectrum. Light sensor 10 serves three functions: i) measuring ambient light intensity to adjust LED brightness; ii) detecting variations in light occupancy signal; and iii) detecting remote control light signals other than occupancy signals. To avoid saturation by high-intensity light from high brightness (HB) LED's, the light sensor signal is on only during off cycle of HB LED 107 PWM. This can be achieved by either turning off the photodiodes' reverse voltage during LED on-phase, or turning the signal amplifier off during LED on-phase, or both. Light sensor is implemented as a separate chip 411 or formed in silicon substrate 513 (see FIG. 4 and FIG. 5 respectively).

Occupancy sensor/motion detector 12 requires a light source and a reflected light detector. Light sensor 10 discussed in the previous paragraph is used as detector. The source should be invisible to human occupants and is on all the time. Accordingly, it would be preferable to use invisible Infrared (IR) light which also has very low power consumption. For these reasons and purposes an additional IR LED 108 is implemented, as shown in FIG. 1. Due to very low current consumption, current control for the IR LED source can be placed internally in the controller integrated circuit 6. Occupancy sensing is achieved by detecting variations of reflected IR signal. Due to elevated brightness of HB LED's, ambient light should be measured only during PWM off-cycle. If both ambient light and occupancy sensing features are implemented using the same optical detector, the two signals from the ambient light and the reflected IR light should be measured separately. To achieve this low power IR LED, source should be driven at a frequency substantially different from HB LED PWM frequency or harmonics. For example, if HB LED's are driven at 100 KHz, IR LED can be driven at 65 KHz or 250 KHz to separate ambient light and occupancy sensor signals.

Remote control IN 14 is a functional block that can adjust LED brightness or turn LED on or off. Remote Control IN 14 is controlled by a signal external to the LED lamp. Such a signal can be delivered by several methods, including, but not limited to, i) an infrared light detected by light sensor 10—in which case the light sensor will be used for ambient light measurement, occupancy sensing, and for receiving remote control signal; ii) a radio frequency signal detected by a dedicated receiver IC; and iii) by a low frequency signal delivered over the power line wires—in which case this function can be shared in the dimming decoder block 4.

In a typical prior art embodiment an LED driver is assembled on a printed circuit board and comprises of surface mount devices (SMD) attached to the board by means of soldering. Each of SMD devices has primary plastic or ceramic package. FIG. 2a shows an example of prior art SMD devices: FET switch 201a, Analog Controller IC 202a, resistors 203a, diodes 204a, rectifier 208a and capacitor 205a soldered onto copper traces 206a on an organic substrate 207a. As can be seen, the LED driver is quite large. Moreover, such an arrangement has several deficiencies: first, each of the components must be protected from external effects by an individual package which increases the cost compared to packageless components, second, the use of discrete components each attached individually further increases cost compared to integrated circuit, and lastly, solder joints used for connecting components terminals and PCB traces are not reliable and will cause the device to fail prematurely, i.e. sooner than predicted failure of LED emitter.

Figure 2B:
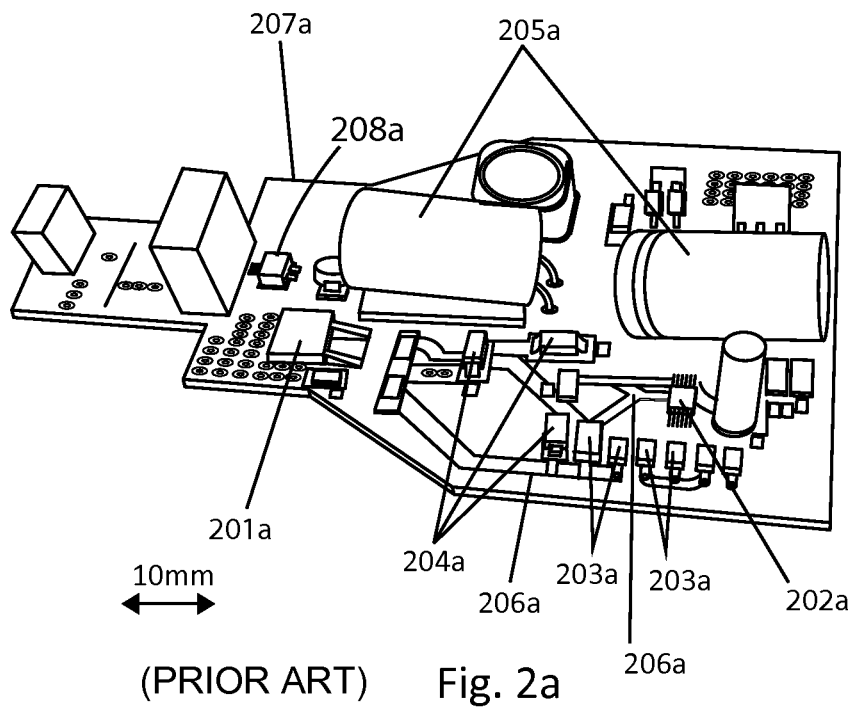
FIG. 2*b* illustrates a LED driver according to one exemplary embodiment of the present invention.

FIG. 2b shows an example of an integrated LED driver according to the present invention. One major difference compared to the prior art driver is the absence of surface mounted discrete power components soldered onto a printed circuit board and encapsulated into individual packages. Power devices of the integrated LED driver as shown in FIG. 2b are situated inside the board 201b and are connected with each other without solder. In addition, integrated devices do not have individual packages therefore. The outside of the integrated driver has only input contact pads 202b, output contact pads 203b, and an optional control, for example dimming control pad 204b.

Power devices of LED driver in FIG. 2b are integrated inside of an organic substrate, for example an FR4 board. Alternatively to organic substrate, power devices may be integrated inside or on the surface of an inorganic substrate, for example a silicon substrate. Advantageously, in the integrated LED driver of FIG. 2b according to the present invention, packageless power devices are connected to each other and other electrical components without the use of solder.

Embodiment 1

Figure 3:
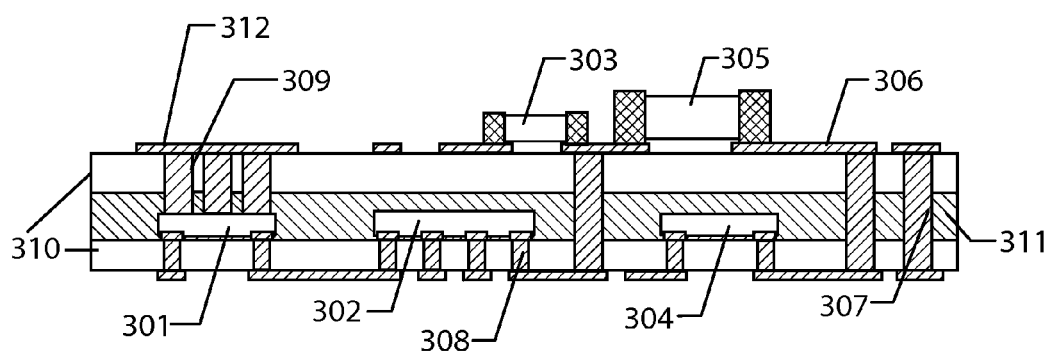
FIG. 3 illustrates a LED driver according to one embodiment of the present invention.

FIG. 3 shows the first embodiment of an integrated LED Driver. With reference to FIG. 3, the rectification bridge 301, controller IC 302, and power transistor 304 are placed in between two organic PCBs (top and bottom substrates) 310 joined by an adhesive 311. Element 304 can also be a power resistor or transient voltage protector. The organic substrate can be, for example, a FR16 organic substrate, or another such substrate known to one skilled in the art. Components 301, 302, and 304 are "packageless", which means that only the active silicon substrate and the interconnects are present, whereas an external packaging, such as plastic, ceramic, or solder bump, are not present. Electrical connection of components 301, 302, and 304 can be achieved, for instance: i) through via opening 308, 307 in the PCB substrate 310; ii) attaching components 301, 302, and 304 to PCB 310 through via openings 308; iii) filling via openings 308, 307 with a metal and forming metal traces 306 on the back side of PCB 310; iv) attaching top PCB 310 by means of an adhesive; v) forming metal filled via, and traces in and on PCB 310 top plate; vi) soldering surface mount (SMT) capacitor 303 and inductor 305 onto the electrical pattern 306 of the top substrate of PCB 310. This sequence of manufacturing steps is commonly known as system in board (SIB) process. Another process that can be used to achieve solderless connection is wire bonding which is commonly used in semiconductor chip assembly. In that case the devices attached to the substrate are connected to each other and to substrate traces by means of gold or copper wire.

Components 303 and 305 represent SMT-type of passive components that have similar form factors and include resistors, capacitors, and inductors. Heat sink 309 is an important feature designed to improve heat transfer from the rectifier bridge 301. It comprises a multitude of tightly packed via (as many as allowed by design rules) connected to metal plate 312 on top of the top substrate 310 and connected to external heat sink (not shown). It is important to note that components 301, 302, and 304 are packageless and are connected to the PCB 310 without solder. Formation and filling of via and metal traces are performed using laser ablation and plating—two methods known to PCB manufacturers.

Embodiment 2

With reference to FIG. 3, devices 303 and 305 are assembled by soldering on top of the PCB 310 because of the size limitations—it is generally problematic to accommodate devices with thicknesses of greater that 0.5 mm inside a PCB stack. This problem can be resolved by using a so called integrated passive device (IPD) components and integrated active device (IAD) components. IPDs' usually have thin film substrates like silicon, alumina or glass. IPD components can be inductors, transformers, capacitors, resistors, fuses—devices required for constructing a LED driver. IAD components are similar to IPDs' except that they are active components such as a rectifier and transistor. IPD and IAD components have several important distinctions compared to conventional SMT devices, including: i) planarity on a thin rigid substrate; ii) integration of two or more components on a single die (chip); and iii) no external package. For example, a single chip may contain several capacitors, resistors, and inductors fabricated on a semiconductor substrate such as silicon substrate sufficiently thin to fit inside a PCB stack. Possible combinations of components and the substrate selection are not limited by the example recited herein.

Figure 4:
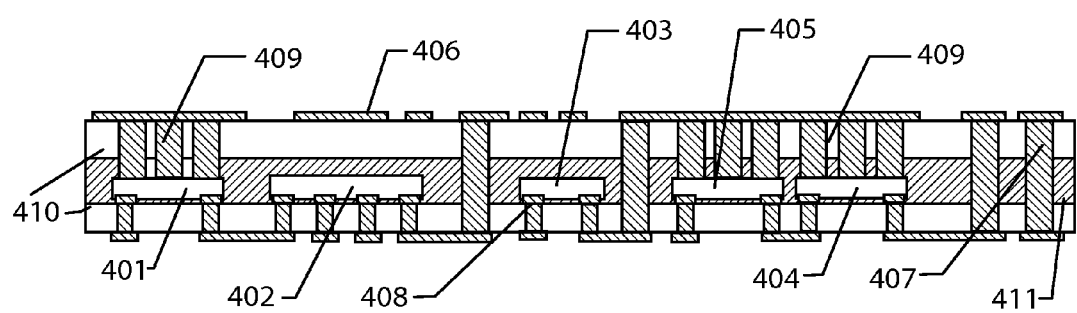
FIG. 4 illustrates an integrated LED driver according to another embodiment of the present invention, in which all electronic components are assembled inside a PCB package in a packageless and solder-free manner.

With continued reference to FIG. 4, capacitor chip 403 and inductor chip 405 shown assembled inside the PCB are packageless and solderless. Components 403 and 405 are IPDs, therefore they may contain more than one capacitor, inductor, resistor, or combinations thereof fabricated on a single monolithic substrate. The driver shown in FIG. 4 appears larger than the driver in FIG. 3 purely for convenience of drawing. The actual physical size of an integrated LED driver implemented with IPD components is smaller than an LED driver implemented with SMT components.

Figure 2B:
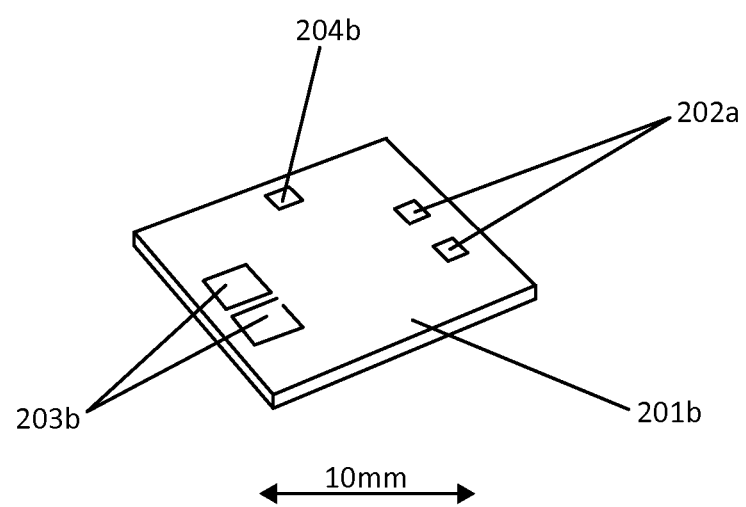

With further continued reference to FIG. 4, devices shown in the figure other than IPD capacitor 403 and IPD inductor 405 are similar to the components shown in FIG. 2: rectification bridge 401, controller IC 402, power transistor 404, interconnect traces 406, through via 407, micro via 408, heat sink 409, PCB substrates (top and bottom substrates) 410, and adhesive layer 411. The rectification bridge 401 and power transistor 404 may be IADs'.

Thus, embodiment 2 of FIG. 4 has two distinctive differences compared to embodiment 1 of FIG. 3: i) the use of solder is eliminated; ii) all components are packageless.

Embodiment 3

Embodiment 2 achieves cost and reliability improvement by eliminating solder joints and using packageless components. Further improvement can be achieved by replacing an organic PCB material that results in significant drawbacks on the entire implementation. For certain implementations, PCB is a relatively poor choice of a support substrate for components and interconnects, because it has low thermal conductivity and a thermal expansion coefficient which is ten-fold greater than that of silicon. A semiconductor such as silicon is the most common material for active devices and IPDs', and is also a practical choice for LED driver applications that must withstand 10,000 thermal cycles.

Figure 5:
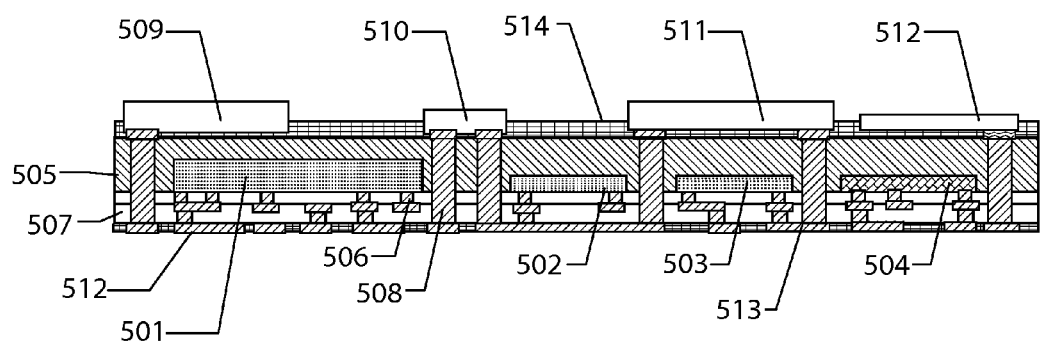
FIG. 5 illustrates an integrated LED driver according to another embodiment of the present invention, in which an active silicon substrate is used.

Embodiment 3 shown in FIG. 5 takes an LED driver implementation to the next level of improvement in reliability, performance, and cost. The advantages are achieved through: i) thermal matching close to an ideal by using an Si substrate to support active and IPD/IAD components and interconnects; ii) forming active and IPD/IAD devices within the substrate; and iii) utilizing parallel processing techniques such as simultaneous through silicon via etching.

Specifically, in reference to FIG. 5, IPD capacitor 501, Zener diode 502, rectification bridge 503, and power transistor 504 are formed within silicon substrate 505. Formed on the same substrate are the first layer of interconnects 506 covered by dielectric 507. An optional second layer of metal interconnects can be formed but not shown in FIG. 5. In the next step through silicon via (TSV) 508 are formed to connect two sides of the substrate. Then, inductor 509, resistor 510, controller IC 511, and light sensor 512 are attached over TSV. Inductors and resistors can be IPD, discrete components or a combination thereof. The next step is the cleaning of TSV opening and forming of TSV metal fill and forming top metal interconnect layer 513. Then passivation dielectric layer 514 is applied to the front and the back side of embodiment 3.

All steps described above are performed while silicon substrate 505 is in a form of a whole wafer, for example 200 mm in diameter. This allows parallel processing (simultaneously) of a multitude of devices by means of lithographic layer transfer. In this case all through via TSV are formed simultaneously by means of applying a lithographic mask and etching silicon material in the openings of said mask. This method is advantageous compared to embodiments 1 and 2 where through vias are formed sequentially, one-by-one, by means of laser ablation.

Electronic components discussed herein can be either fabricated in a monolithic Si substrate or as a separate chip attached to said substrate by means of TSV. For example, IPD capacitor 501 shown in FIG. 5 as a part of the substrate can be implemented as a separate chip attached to the substrate. Similarly, controller IC 511 shown as a separate chip can be implemented in the substrate. This flexibility of the integration method is important for performance, reliability, and cost optimization.

Embodiment 4

Figure 6:
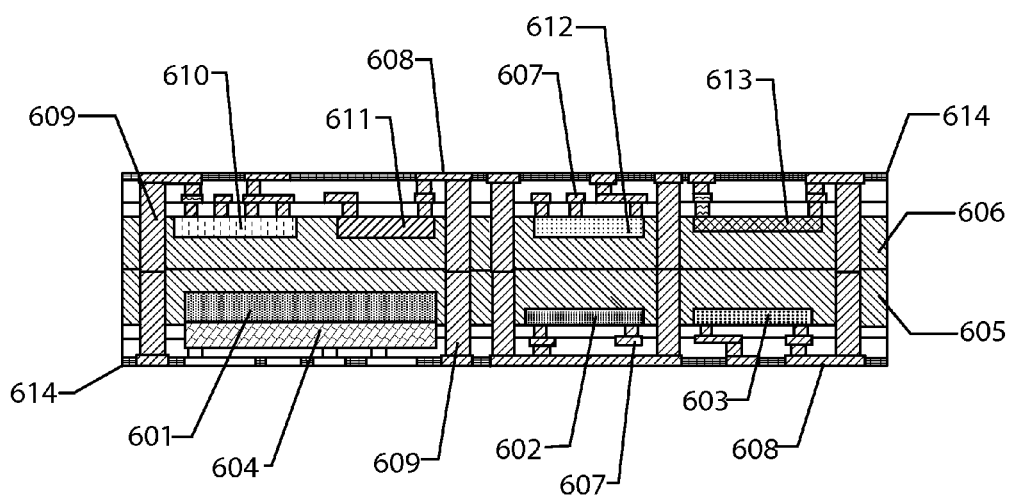
FIG. 6 illustrates an integrated LED driver according to another embodiment of the present invention, in which two silicon substrates are joined by through silicon via TSV.

All the devices required for implementing a LED driver can be manufactured as an active Si device or an IPD on a silicon substrate. Thus, it is more productive to join two silicon substrates containing a multitude of devices rather than picking and placing one device at a time onto a silicon substrate. FIG. 6 illustrates such an assembly method and apparatus. IPD capacitor 601, Zener diode 602, and rectification bridge 603 are formed within silicon substrate 605 in a similar manner to embodiment 3. Further, an IPD inductor 604 is formed using interconnect layers 607 (only one layer is shown in FIG. 6 to simplify the drawing). A second interconnect layer can be formed by repeating same operations used to build layer 607. IPD resistors are implemented on the same silicon substrate but not shown in the figure. A second silicon substrate 606 is joined to first substrate 605 by means of TSV 609. This can be achieved by pre-forming via openings on both substrates, then filling via openings with metal only on one substrate. The next step is the joining of two substrates with the filled via aligned with the hollow via. Subsequently, the hollow via are filled by means of metal plating forming an electrical contact between the two substrates. The following active devices are formed within substrate 606: controller 610, radio receiver 611, power transistor 612, and light sensor 613. Two (shown in FIG. 6) or more levels of interconnects 607 or 608 are implemented on substrate 606. Similarly, substrate 605 may have more than two interconnect layers shown in FIG. 6. After joining the substrates and filling TSVs, top interconnect layers are protected by top and bottom passivation dielectric layers 614.

Combination of Embodiments 1, 2, 3, and 4

Integration methods for each specific component can be flexible and will depend on specific aims of optimization of performance, reliability, and cost. For example, resistors in FIG. 3 can be implemented either as SMT components on top of the board, or imbedded solderless components inside the board. In another example, electronic components discussed in embodiment 3 can be either fabricated in a monolithic Si substrate, or as a separate chip attached to said substrate by means of TSV. For example, IPD Capacitor 501 shown in FIG. 5 as a part of the substrate can be implemented as a separate chip attached to said substrate. Similarly, Controller IC 511 shown as a separate attached chip can be implemented in the substrate. Furthermore, implementation of two joined silicon substrates in FIG. 6 can have separate chips attached to one or both sides, similar to the implementation shown in FIG. 5.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:
1. A driver device for driving an LED lighting device comprising:
at least one substrate;
at least one power capacitor that provides LED driving current to drive the LED lighting device;

at least one power resistor, wherein the power capacitor and the power resistor are attached to the substrate and solderlessly connected to each other;
a rectifier for rectifying AC to DC;
a LED controller circuit for controlling the LED driving current, wherein the rectifier and the LED controller circuit are connected to the power resistor and the power capacitor, wherein:
the substrate includes:
a first substrate over which the rectifier, power resistor and LED controller circuit are positioned; and
a second substrate positioned over the first substrate to sandwich the rectifier, power resistor and LED controller circuit therebetween; and
the driver device includes discrete components attached over the second substrate with solder.

2. The driver device of claim 1, wherein the rectifier and the LED controller circuit are solderlessly connected to the power resistor and the power capacitor.

3. The driver device of claim 2, further comprising a power transistor solderlessly connected to the power resistor and power capacitor.

4. The driver device of claim 1, wherein the power resistor and the power capacitor are packageless components.

5. The driver device of claim 1, wherein the power capacitor and the power resistor are sandwiched between the first and second substrates.

6. The driver device in claim 1, further comprising:
a plurality of vias containing conductive material in contact with the rectifier on one end and in electrical contact with a heat sink on the other end.

7. The driver device of claim 1, wherein:
the power capacitor includes a plurality of power capacitors formed on the same monolithic substrate.

8. The driver device of claim 1, wherein:
the power capacitor and the power resistor are formed on the same monolithic substrate.

9. The driver device of claim 1, wherein the power capacitor has a capacitance value of greater than 1 nF and formed on the same monolithic substrate as other electronic components of the driver device.

10. The driver device of claim 1, further comprising an inductor having an inductance value of greater than 1 nH and formed on the same monolithic substrate as other electronic components of the driver device.

11. The driver device of claim 1, further comprising an input stage transient voltage protector solderlessly connected to the power resistor and power capacitor.

12. The driver device of claim 1, wherein the power capacitor is contained in an integrated passive device.

13. The driver device of claim 1,
wherein:
the substrate includes a silicon substrate; and
the power capacitor and the rectifier are positioned within the silicon substrate.

14. The driver device of claim 13, wherein the power capacitor is contained in an integrated passive device.

15. The driver device of claim 13, wherein the rectifier and power resistor are contained in at least one integrated passive or active device.

16. The driver device of claim 13, further comprising a dielectric layer attached to the silicon substrate, wherein the rectifier, power capacitor and LED controller circuit are connected to each other through electrical connections through the dielectric layer.

17. The driver device of claim 13, wherein the power capacitor and the rectifier are part of a wafer for producing multiple copies of at least a part of the driver device.

18. The driver device of claim 1, further comprising:
a power transistor;
a Zener diode, all of which are solderlessly connected to each other;
wherein:
the substrate includes a silicon substrate; and
the power capacitor, rectifier, LED controller circuit, power transistor and Zener diode are positioned within the silicon substrate.

19. The driver device of claim 18, wherein:
some electrical components are disposed within the first substrate and some of the other electrical components are disposed within the second substrate.

20. The driver device of claim 18, further comprising
a radio receiver and a light sensor both of which are solderlessly connected to other electrical components;
wherein the radio receiver and light sensor are disposed within the silicon substrate.

21. A driver device for driving an LED lighting device comprising:
at least one substrate;
a rectifier for rectifying AC to DC;
at least one output power capacitor that receives the DC and provides LED driving current to drive the LED lighting device;
a controller integrated circuit (IC) that controls the DC provided to the power capacitor;
wherein the rectifier, power capacitor and controller IC are attached to the substrate and solderlessly connected to each other, wherein:
the substrate includes:
a first substrate over which the rectifier and controller IC are positioned; and
a second substrate position over the first substrate to sandwich the rectifier and the controller circuit therebetween; and
an adhesive is disposed between the first and second substrates to fix the two substrates together.

22. The driver device of claim 21, further comprising a power transistor controlled by the controller IC and adapted to provide the DC to the power capacitor, wherein the power transistor is solderlessly connected to other electrical components of the driver device.

23. The driver device in claim 21, further comprising a plurality of vias formed through the substrate and containing conductive material in contact with the rectifier on one end and in electrical contact with a heat sink on the other end.

24. The driver device of claim 21, wherein:
the power capacitor includes a plurality of power capacitors formed on the same monolithic substrate.

25. The driver device of claim 21, wherein the power capacitor has a capacitance value of greater than 1 nF and formed on the same monolithic substrate as other electronic components of the driver device.

26. The driver device of claim 21, further comprising an inductor having an inductance value of greater than 1 nH and formed on the same monolithic substrate as other electronic components of the driver device.

27. The driver device of claim 21, further comprising an input stage transient voltage protector solderlessly connected to other electrical components of the driver device.

28. The driver device of claim 21, wherein:
the substrate includes a silicon substrate; and
the power capacitor and the rectifier are positioned within the silicon substrate.

29. The driver device of claim 21, wherein the power capacitor and the rectifier are part of a wafer for producing multiple copies of at least a part of the driver device.

30. The driver device of claim 21, further comprising:
a power transistor and
a Zener diode, both of which are solderlessly connected to other electrical components of the driver device;
wherein:
the substrate includes a silicon substrate; and
the power capacitor, rectifier, LED controller circuit, power transistor and Zener diode are positioned within the silicon substrate.

31. The driver device of claim 30, wherein:
the substrate includes first and second silicon substrates joined to each other; and
some electrical components of the driver device are disposed within the first substrate and some of the other electrical components of the driver device are disposed within the second substrate.

32. The driver device of claim 30, further comprising:
a radio receiver and a light sensor both of which are solderlessly connected to other electrical components of the driver device;
wherein the radio receiver and light sensor are disposed within the silicon substrate.

* * * * *